May 29, 1956
R. D. SALMON ET AL
2,747,712
CLUTCH MECHANISM
Filed Feb. 20, 1952
3 Sheets-Sheet 2
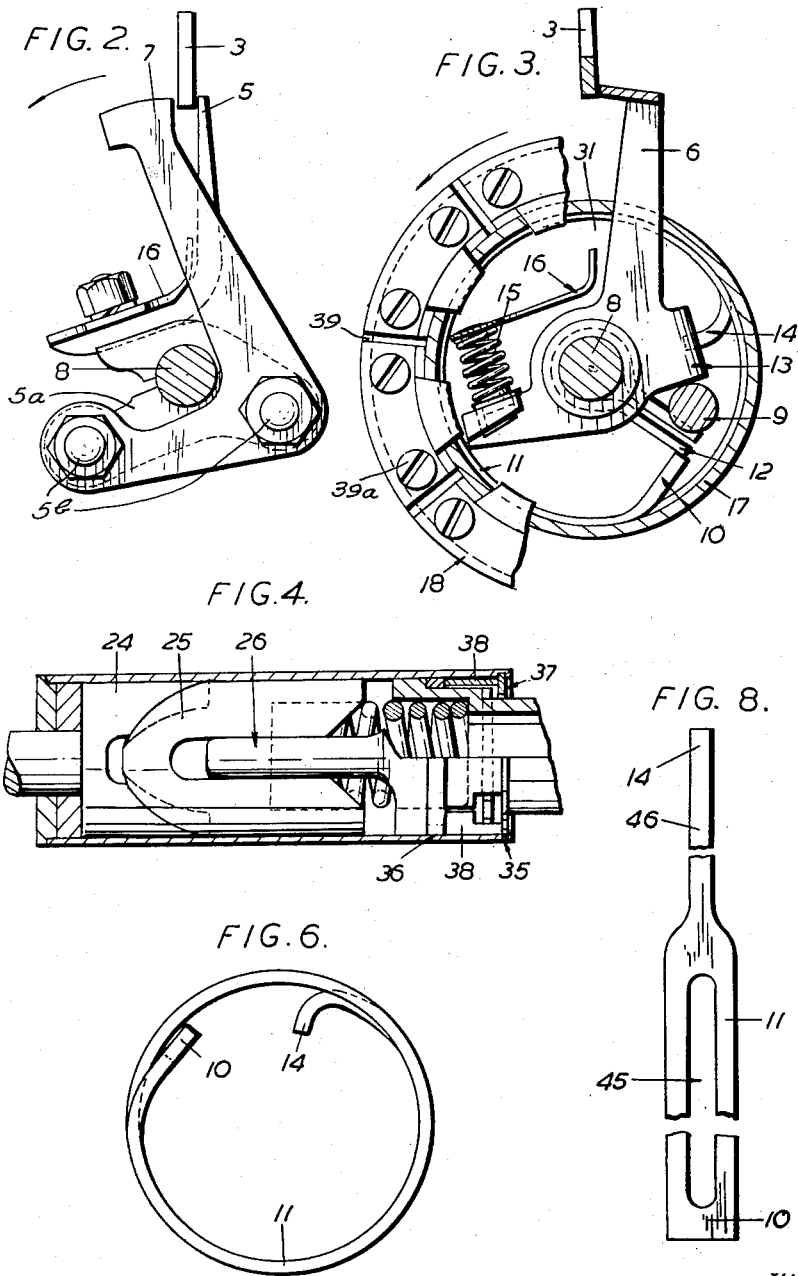
INVENTOR
R.D. SALMON·
L.A.G. NASH
BY
*Robert Harding*
ATTORNEY May 29, 1956  R. D. SALMON ET AL  2,747,712
CLUTCH MECHANISM
Filed Feb. 20, 1952  3 Sheets-Sheet 3
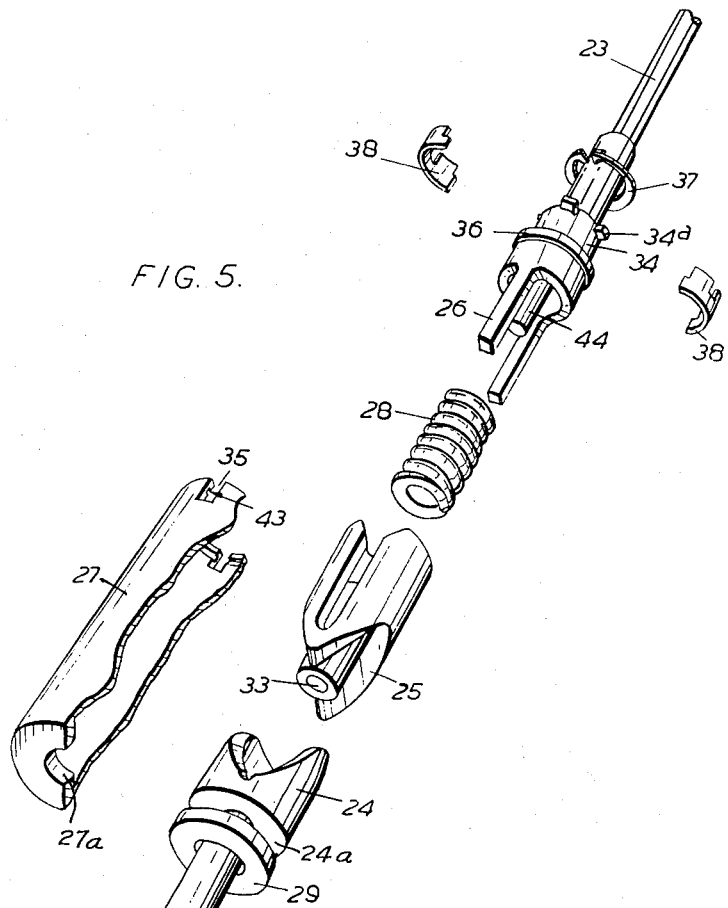
INVENTOR
R.D. SALMON·
L.A.G. NASH
BY
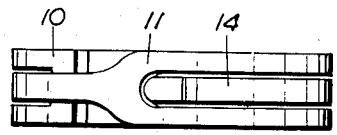
ATTORNEY

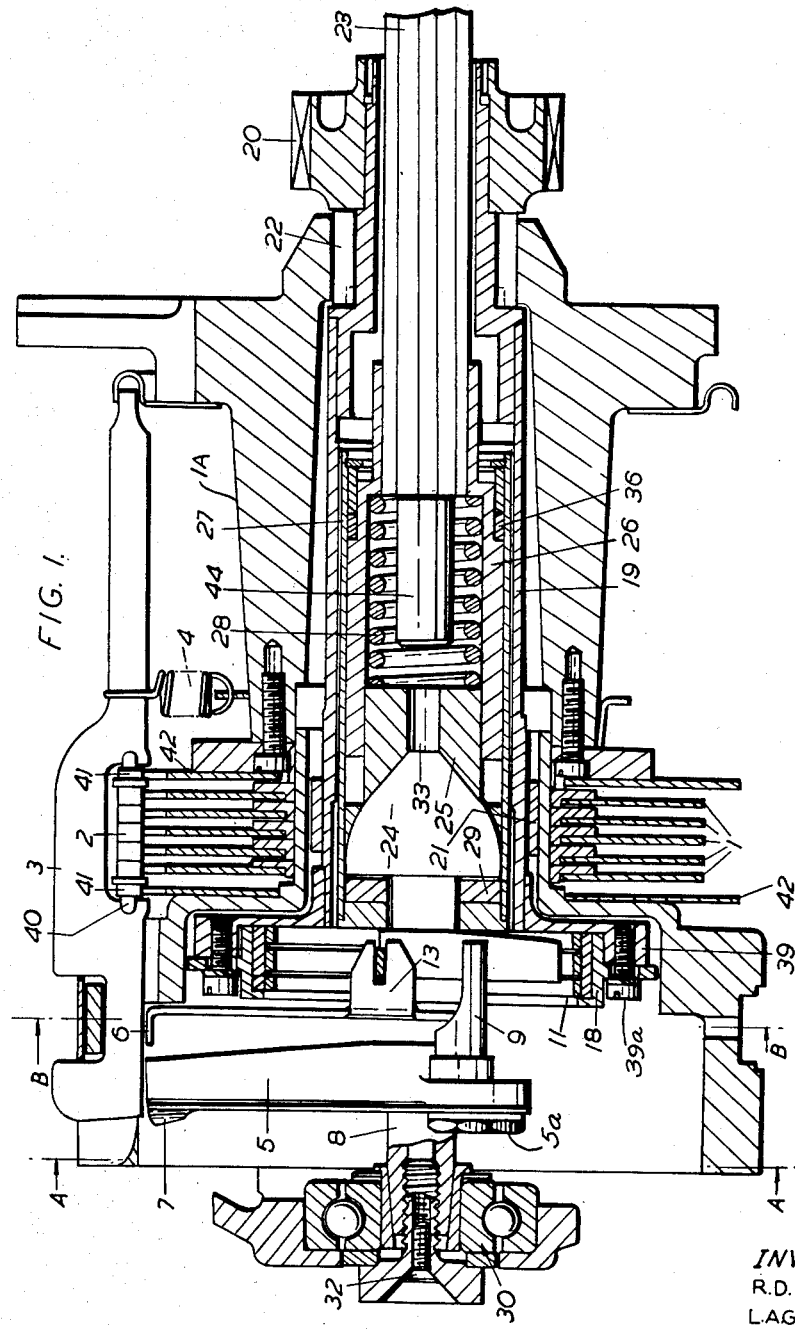

United States Patent Office 2,747,712
Patented May 29, 1956

2,747,712

CLUTCH MECHANISM

Reginald Dennis Salmon and Leonard Alfred George Nash, Croydon, England, assignors to Creed and Company Limited, Croydon, England, a British company Application February 20, 1952, Serial No. 272,672

Claims priority, application Great Britain February 26, 1951

6 Claims. (Cl. 192—102)

This invention relates to apparatus in which a rotatable member (such as the type wheel in a teleprinter) may be driven from a continuously rotating shaft through a friction clutch.

The torque developed by such a friction clutch varies according to the co-efficient of friction of the engaging surfaces, the degree of lubrication (which will, in turn, vary with temperature) and the pressure holding the engaging surfaces in contact.

The principal object of the present invention is to provide means in such a friction clutch whereby the effect of these variables may be automatically compensated so as to produce a constant predetermined torque.

In its broadest aspect, the present invention provides apparatus comprising a rotatable member, a continuously rotating shaft, a friction clutch for driving said rotatable member from said shaft, means for applying pressure to engage said clutch and automatic means for reducing said pressure as soon as the torque developed by the clutch tends to exceed a predetermined value.

More specifically there is provided apparatus comprising a first rotatable member, a continuously rotating shaft, a friction clutch for driving said rotatable member from said shaft, means for applying pressure to engage said clutch and a first spring connected between said friction clutch and said rotatable member and arranged to relax the clutch as soon as the torque developed by the clutch tends to exceed a predetermined value.

An embodiment of the invention will now be described with reference ot the accompanying drawings of which:

Fig. 1 is a side elevation in section of mechanism for driving a spline shaft from a continuously rotating shaft and for stopping it in any desired one of a plurality of possible positions.

Fig. 2 is a section on the line A—A of Fig. 1,

Fig. 3 is a section on the line B—B of Fig. 1.

Fig. 4 is a plan view of a shock absorber unit forming part of the mechanism shown in Fig. 1.

Fig. 5 is an exploded view of the shock absorber unit.

Fig. 6 is an elevation of the rolled clutch band.

Fig. 7 is a plan view of the rolled clutch band, and

Fig. 8 is a view of the unrolled clutch band.

In the embodiment to be described, the invention is applied to printing telegraph apparatus and in particular to printing telegraph apparatus of the type in which a clutch lever rotating in advance of the rotatable member (which may be, for example, the type-wheel) is, arranged when arrested by a selected stop member, to positively disengage the clutch so that the rotatable member swiftly comes to rest in a position defined by the selected stop member. Printing telegraph apparatus of this type is disclosed in the co-pending application of R. D. Salmon filed May 11, 1951, and bearing Serial No. 225,700, now Patent No. 2,655,555.

It is, however, to be understood that the invention is not limited in its application to printing telegraph apparatus of this or any other type but has a wide field of application to other apparatus incorporating a friction clutch.

Referring to Fig. 1, there are provided five notched permutation discs 1, which are assumed to be set by means of any well-known selector mechanism (not shown) said discs rotatably mounted on a fixed frame 1a. Resting on the outside diameters of the discs 1 are twenty-six sets of rollers 2 each set of which supports a respective stop member such as 3. These stop members are positioned so that, if selected, they will move under the action of individual springs such as 4 in to notches in the peripheries of discs 1, which in the case of a selected stop member, will present an aligned slot across the peripheries of its five discs and thus into the path of rotation of a first stop arm 5 (Figs. 1 and 2), a clutch lever 6 (Figs. 1 and 3) and a second stop arm or latch member 7 (Figs. 1 and 2).

The first stop arm 5 is clamped to a shaft 8 and the second stop arm 7 is bolted to lower portion 5a of the first stop arm 5 by means of bolts 5b shown in Fig. 2. This second stop arm is of resilient material such as spring steel and its leading edge is so shaped that when the stop arm assembly is travelling in the direction of the arrow (Fig. 2) stop arm 7 is cammed over the end of the selected stop member 3 and springs back to shape on the other side of the stop member to prevent movement in the opposite direction.

Also attached to stop arm 5 is a driving arm 9 (Figs. 1 and 3). The operative edge of driving arm 9 may be adjusted to a limited extent in its orientation about centre shaft 8 as will be more fully explained later. The driving arm 9 is normally rotated by pressure from the driving end 10 (Fig. 3) of a clutch band 11 acting through a compensating spring loop 12 which is free to rotate around shaft 8.

The clutch lever 6 is a running fit on shaft 8 and carries a slotted projection 13 (Figs. 1 and 3) into which is fitted the trailing end 14 of clutch band 11. As shown in Fig. 3, clutch lever 6 also provides an anchorage for one end of a clutch spring 15.

Radial movement of clutch lever 6 is restricted by a stop 16 which is bolted to stop arm 5 and provides an anchorage for the other end of clutch spring 15.

The clutch band 11, which is preferably of cast steel, works in a clutch lining 17 of friction material fixed inside a clutch housing 18. As shown in Fig. 3, this clutch housing is made in segments in such a manner that the diameter may be varied to compensate for wear in the lining.

Clutch housing 18 is secured to a driving tube 19 (Fig. 1), to the other end of which is fixed a pinion 20. This pinion meshes with a continuously rotated driving pinion (not shown) which is in turn driven from the main driving motor. By this means the clutch housing 18 and the driving tube 19 are continuously rotated in their plain bearings 21 and 22.

The type-wheel (not shown) or other load is driven from a spline shaft 23. Between the shaft 8 and spline shaft 23 is fitted the shock absorber assembly. This assembly is shown in Figs. 1, 4 and 5. It comprises a concavely cut cam 24 integral with shaft 8 and co-operating with a mating convex cam track formed in a bobbin 25. This bobbin is preferably formed of a plastic material to reduce its inertia. The bobbin 25 is free to slide along shaft 8 and is guided by the two arms of a fork piece 26 splined to fit spline shaft 23. The fork piece 26 is secured to the interior of a cylindrical casing 27 so as to rotate therewith.

Between the bobbin 25 and the fork piece 26 is fitted a helical compression spring 28 which serves to urge the cam surfaces on members 24 and 25 into intimate contact with each other and also causes a damping block 29 to be compressed between the end 27a of the casing 27 and the back face 24a of cam 24.

The whole assembly mounted on spline shaft 23 and shaft 8 is free to revolve, supported by ball bearings 30 Fig. 1 and by a second bearing (not shown) elsewhere in the teleprinter.

When the whole of the typewheel system is revolving, the drive is taken from the main motor drive shaft, through pinion 20, clutch driving tube 19, clutch housing 18, clutch lining 17, clutch band 11, spring loop 12, driving arm 9 and stop arm 5 to shaft 8 and through the shock absorber to spline shaft 23. In the driving condition clutch band 11 is expanded in the clutch lining 17 by clutch spring 15, and so takes the drive frictionally.

When combination discs 1 are set, a stop member such as 3 moves into the path of stop arm 5, clutch-lever 6 and latch 7 which are revolving with the spline shaft 23.

Clutch lever 6 being set in advance of stop arm 5, first strikes the stop member 3, and is brought to rest. In doing so, it arrests clutch band 11 and causes spring 15 to compress and by force of the momentum of stop arm 5 and thus removes the effective pressure of clutch spring 15 from the ends of clutch band 11 thereby disengaging the clutch.

Stop arm 5 and latch 7 which in the running condition are revolving slightly behind clutch lever 6 next strike stop member 3 and in doing so arrest shaft 8 and cam 24.

The typewheel system, carrying with it spline shaft 23, casing 27 and bobbin 25, overshoots. The angular displacement of bobbin 25 with respect to cam 24 brought about by the overshoot, causes bobbin 25 to be driven towards the spline shaft and so compresses spring 28. The ultimate limit of movement for the bobbin in this direction is determnied by a stop 44 integral with shaft 23.

The displacement of casing 27 with respect to cam 24 causes damping to take place on damping block 29 which is under pressure from spring 28.

At the beginning of the first overshoot, latch 7 is cammed over the end of stop member 3 and springs back into position so that stop member 3 is trapped between stop arm 5 and latch 7 as shown in Fig. 2.

When the first overshoot has reached its limit, the energy stored in spring 28 is dissipated through the cam surfaces in accelerating the typewheel system in the opposite direction, and bringing about an overshoot in the opposite direction.

This overshooting in alternative directions continues, until all the kinetic energy in the system has been absorbed by frictional damping, and the system is at rest.

In the latched condition, clutch spring 15 is prevented from expanding clutch band 11, and consequently no drive is taken from the continuously running clutch housing.

Clutch spring 15 which in the driving condition, expands clutch band 11 against clutch lining 17, is anchored at one end to clutch lever 6 and through this to the trailing end of clutch band 11, and at the other is anchored on stop plate 16. Spring 15 exerts pressure on the driving end 10 of clutch band 11 through stop plate 16, stop arm 5, driving arm 9 and spring loop 12.

The clutch band 11 is shown in Figs. 6 and 7 removed from its housing. Initially this clutch band is a spring steel strip of the form shown in Fig. 8 (in which it is shown broken away in two places in view of its considerable length). It is then bent round and the tongue 46 terminating in the trailing end 14 is inserted through the slot 45 until the appearance of the band is as shown in Figs. 6 and 7. By employing a clutch band of this type as opposed for example, to a band of helical formation it is ensured that both the driving end 10 and the trailing end 14 lie in a plane radial to the axis of rotation. Otherwise there is a tendency for the expanded clutch band to twist and jam in the clutch housing or for a screwing action to take place along the axis of the rotation.

The driving end 10 of the clutch band 11 delivers the torque to the driving arm 9 through a resilient coupling namely spring loop 12.

The object of the spring loop 12 is to provide means whereby the effect of such variables as lubrication and contact pressure may be automatically compensated so as to produce a constant pre-determined torque.

When the clutch is engaged, the clutch band 11 is expanded by pressure from spring 15.

It is evident then that the action of spring 15 is to force apart the ends 10 and 14 of the clutch band 11 and to bring the band into engagement with the clutch lining 17. The initial pressure between the two ends of the band is determined by the strength of the spring 15.

However, due to the servo-action of the clutch band acting against the clutch lining, and to the inertia of the device connected to shaft 8, the force exerted by the driving end 10 of the clutch band, exceeds the force acting on the trailing end 14 due to the spring 15.

The torque control feature, therefore, is arranged to restrict this difference automatically, when the driving torque reaches a pre-determined figure.

When the clutch is engaged, a gap exists at 31 (Fig. 3). If the pressure given by driving end 10 becomes great enough, the two ears of the spring loop 12 are forced together and the band 11 and the clutch lever 6 move in a counter-clockwise direction (as seen in Fig. 3) until the clutch lever 6 touches the stop plate 16.

Any further deflection of spring loop 12 will cause the separation of the clutch band ends 10 and 14 to be reduced, and the torque will drop. As the torque drops, the ears of spring loop 12 will open and so torque will increase again. In this way a state of equilibrium is reached, at a certain value of torque.

The value of torque at which this state of equilibrium is reached, is controlled in the following manner:

By rotating the driving arm 9, which carries an eccentric projection, the angular distance between spring loop 12 and stop plate 16 can be regulated. Therefore this adjustment varies the amount of deflection which must take place in spring loop 12 before torque is restricted.

Grease is fed into the shock absorber casing 27 through a hole in the centre of shaft 8 by removing a screw 32 (Fig. 1) and applying a grease gun.

During operation of the shock absorber, bobbin 25 oscillates violently in a piston-like manner in the casing and the grease present is alternately subjected to pressure very much above and very much below atmospheric pressure.

A hole 33 is provided in bobbin 25 to minimise this pressure difference, but in spite of this, there is a strong tendency for grease to escape from the casing.

The damping block 29 which is under pressure from cam 24 on one side and the casing 27 on the other, provides a seal at the clutch end. At the spline shaft end, however, from which the shock absorber is assembled, it is necessary to provide special sealing, while at the same time three other important requirements must be met. The following must be provided.

1. A positive drive radially between fork piece 26 and casing 27.

2. A positive end location of fork 26 against spring 28 and,

3. Means of dismantling the shock absorber for inspection or servicing.

These requirements are met in the following way: A collar 34 (Fig. 5) carrying four lugs 34a is welded to fork piece 26 so that the lugs will engage in slots 35 in casing 27. The diameter of collar 34 is less than that of the fork piece 26 so that the rear end of the latter forms a shoulder. Against this shoulder and around collar 34 is placed a rubber ring 36. A sleeve 38 split into two parts and provided with clearing slots for the lugs 34a is fitted round the collar 34. One end of sleeve 38 abuts against the rubber ring 36 and the other end abuts against a circular clip 37 fitting in a groove 43 in the casing 27. When the shock absorber unit is assembled the pressure of spring 28 causes the rubber ring 36 to be compressed between the rear end of the fork piece 26 and the sleeve 38 so forming an oil-tight seal.

Owing to the large number of limits involved in the fitting of the clutch band in the housing, it has been found necessary to make the clutch housing in such a manner that the diameter of the working face may be adjusted.

This is done by making the housing as a set of segments 18 (Fig. 3), each fixed to a back plate 39 (Fig. 1) by means of screws 39a.

The housing is adjusted with the clutch lining 17 in position by means of a simple plug gauge.

In the latched-up condition the selected stop member 3 is pinched between clutch lever 6 and latch 7.

To restore the device to the clutch engaged position, the permutation discs are again rotated so that the notches therein are no longer aligned with respect to the selected stop member and consequently the said stop member is urged radially outward against the tension of spring 4.

In order for a permutation disc 1 to lift the stop member 3 the frictional load imposed by the pinching of stop member 3 by lever 6 and latch 7 must be overcome, and consequently the radial thrust of the discs 1 is moderately heavy.

In order to take this radial thrust without causing the stop member 3 to bind in its slot, the rollers 2 are carried on a pin 40 which has at each end a shouldered roller 41 running in radial slots in racks 42, which are screwed to the stationary frame 1a. These racks 42 are of similar construction to the discs 1 except that they are of greater diameter and the slots are big enough to take the shouldered rollers 41. The pins 40 fit in recesses in stop members 3 which permit some side play. By this means the stop members are lifted without receiving any side thrust.

While the principles of the invention have been described above in connection with specific embodiments, and particular modifications thereof, it is to be clearly understood that this description is made only by way of example, and not as a limitation on the scope of the invention.

What we claim is:

1. Apparatus comprising a fixed frame, rotatable means and continuously rotating means both rotatably mounted on said frame, a utilization device, a pair of relatively movable stop cooperating members coupled to said rotatable means, first spring means coupled between said members for normally maintaining said members at a predetermined angular spacing with respect to each other, an expansible element having one end thereof coupled to a first of said members, second spring means disposed between said second member and the other end of said expansible element, said element adapted in its normal position to engage said rotatable means with said rotating means, stopping means movably mounted on said frame for arresting said members at predetermined angular positions, said stopping means adapted to arrest said first member in advance of said second member, said first spring means adapted to absorb a first portion of the kinetic energy of said rotatable means upon engagement of said first member with said stopping means, the relative movement between said members after engagement of said first member with said stopping means adapted to cause said expansible means to disengage said rotatable means from said rotating means, adjustable means disposed between said second spring and said second member for adjusting the predetermined angular spacing of said members, and kinetic energy absorbing means coupled between said utilization device and said rotatable means, said kinetic energy absorbing means adapted to absorb the balance of said kinetic energy.

2. Apparatus as claimed in claim 1, further comprising latch means fixed to said second member, said latch means adapted to maintain said second member in contact with said stopping means after initial engagement of said member thereby.

3. Apparatus as claimed in claim 1 wherein said rotating means further comprises a circular clutch housing and a clutch lining, said lining adapted to cooperate with said expansible element, a plurality of segmental members attached to said housing and adapted to support said lining from said housing, said segmental members adapted to be adjustably moved in a radial direction to compensate for wear in said lining.

4. Apparatus as claimed in claim 1 wherein said expansible element comprises a metal strip having a longitudinal slot for substantially half its length and a tongue of reduced section for the remainder of its length, said element being rolled through more than one turn, with the tongue inserted through the slot.

5. Apparatus as claimed in claim 1, wherein said rotatable means comprises a pair of rotatable members and wherein said kinetic energy absorbing means comprises a pair of cam members having complementary cam contours, a first of said cam members rotatable with said first rotatable member, said second cam member slidably coupled to said utilization device for driving same, and additional spring means for urging the cam surfaces of said cam members into intimate mutual contact, the cam contours being such that relative torsional movement between said rotatable member and said utilization device results in the storage of energy in said additional spring means.

6. Apparatus as claimed in claim 5 further comprising a forked piece fixed to said utilization device, said second cam having a pair of complementary slots therein adapted to accommodate the forks of said piece, said additional spring means disposed between said forked piece and said second cam, said cam adapted to slide longitudinally along the forks of said piece.

References Cited in the file of this patent

UNITED STATES PATENTS 2,582,077   Smith _____ Jan. 8, 1952